Sept. 8, 1959   E. L. LAUNDER ET AL   2,903,565
TABLE AND CLAMP FOR SUPPORTING AND HOLDING
WORK IN A FABRICATING MACHINE
Filed Feb. 28, 1958   5 Sheets-Sheet 1

INVENTORS
ERNIE L. LAUNDER
MAX FREDERICK JR.
BY ALLEN W. LOUDON

AGENT

United States Patent Office 2,903,565
Patented Sept. 8, 1959

2,903,565

TABLE AND CLAMP FOR SUPPORTING AND HOLDING WORK IN A FABRICATING MACHINE

Ernie L. Launder, Montebello, Max Frederick, Jr., Whittier, and Allen W. Loudon, Downey, Calif., assignors to H. & L. Tooth Company, Montebello, Calif., a corporation of California Application February 28, 1958, Serial No. 718,316

20 Claims. (Cl. 219—124)

This invention has to do with a work fabricating machine, it being a general object of the invention to provide a machine which is operable to handle an electric arc and welding material and to support and hold work or parts relative thereto to be assembled, so that the parts are accurately, securely and dependably held as the arc is maintained and the welding material fed, and while relative movement is generated between the work and the arc where the material is fed, to the end that the work is welded at various parts, for instance, continuously about a particular portion, or as circumstances may require.

This is a continuation in part of application Serial No. 338,292, filed February 24, 1953, entitled Work Fabricating Machine, now Patent No. 2,835,786.

The machine which is the object of the present invention can be used to advantage in the fabricating of various parts by welding. However, it is particularly practical and can be used to great advantage in the fabricating of digger teeth, or the like, where short runs and right angle turns are involved, and preferably without the use of chill bars or back-up rings and the like. When reference is made to the work acted upon as being a digger tooth or as being digger teeth, it is to be understood that this particular reference is made merely to facilitate an understanding of the invention and furthermore, when a particular tooth construction is referred to, it is to be understood that such detail is set forth merely to facilitate an understanding of the invention. The instant machine is particularly useful in the welding of relatively thin sections to relatively heavy sections, all without burning through at the weld.

It is a general object of this invention to provide a machine adapted to readily receive work parts that are to be assembled, and which carries an electrode at or from which a rod of welding material is fed, and which serves to move the work parts and the electrode relatively and in a predetermined manner, to the end that the parts are welded one to the other and, as the cycle of the machine is repeated, successive like work parts are likewise welded.

Another object of this invention is to provide a machine with a table and clamp which is such that the work parts are readily applicable to the machine and are effectively supported and held and electrically connected preliminary to the machine going into action to apply welding thereto.

Another object of this invention is to provide a work carrying table and holding clamp in a machine of the general character referred to, characterized by a simple combination and relationship of parts which make for simple, reasonable manufacture as well as practical and rapid operation of said machine.

The various objects and features of the invention will be fully understood from the following detailed description of a typical preferred form and application of the invention, throughout which description reference is made to the accompanying drawings, in which:

The present invention provides a work carrying table and holding clamp for use in a work fabricating machine X that can be used to advantage to assemble or fabricate various parts of work and, since it is particularly practical as applied to the fabrication of digger teeth Y, it is shown in a form designed for that purpose, and in the drawings, digger teeth of typical form are set forth. For example, in Figs. 1 and 2 there is illustrated a digger tooth cap construction Y characterized by a flat heavy blade 10 and a cup-like sheet metal body 11 which is applied to one side of the blade to establish a tapered or converging cup-shaped opening 13 adapted to receive a tooth shank. The cap construction, as shown in the drawings, involves the body 11 having sides 15 and an end 16 that engages the back side 14 of the blade, and the machine of the present invention is provided to apply welding Z to join the sides 15 and 16 of the body 11 to the blade 10.

Figure 2:
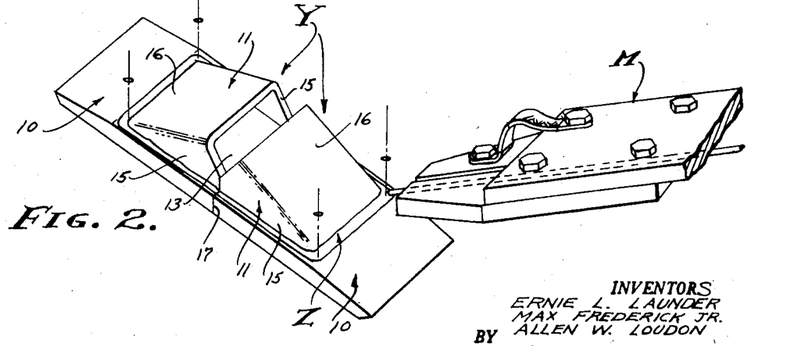
Fig. 2 is an enlarged perspective view showing a typical piece of work being acted upon by the machine shown in Fig. 1.
Figure 11:
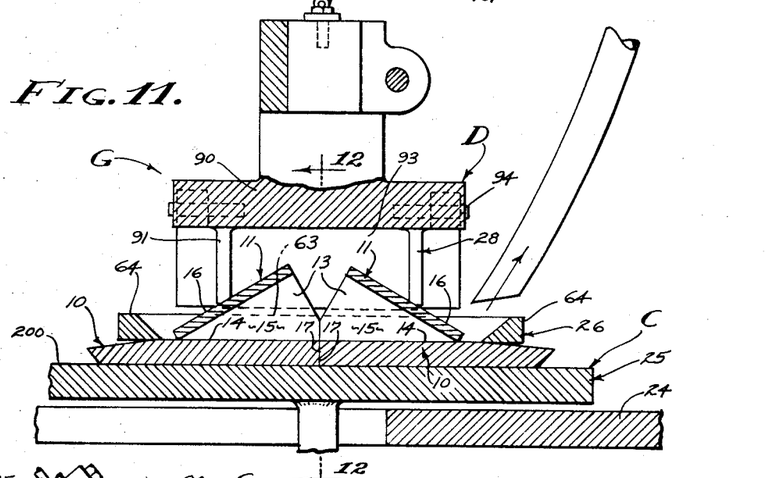
Fig. 11 is an enlarged detailed sectional view taken at work located in the machine and showing the general relationship of parts occurring in the machine at the work operated on thereby. And, Fig. 12 is a sectional view of the structure shown in Fig. 11, being a view taken as indicated by line 12—12 on Fig. 11.

To facilitate rapid production it is preferred that the machine of the present invention be employed to handle two groups or units of work parts or caps Y simultaneously, in which case the blades 10 of the groups of caps are arranged end to end, so that the blades are oppositely disposed. The bodies 11 of the two individual caps are arranged on the blades, and in the case illustrated, the abutting ends of the blades 10 are flat at 17. With the cap parts just referred to arranged, as shown in Figs. 2 and 11 a single continuous line of welding Z may be applied in rectangular form to extend around the two related caps, effectively joining the bodies of the caps to the blades, and when the welding has been completed the two caps are parted by severing or breaking the welding that occurs where the caps adjoin.

Figure 1:
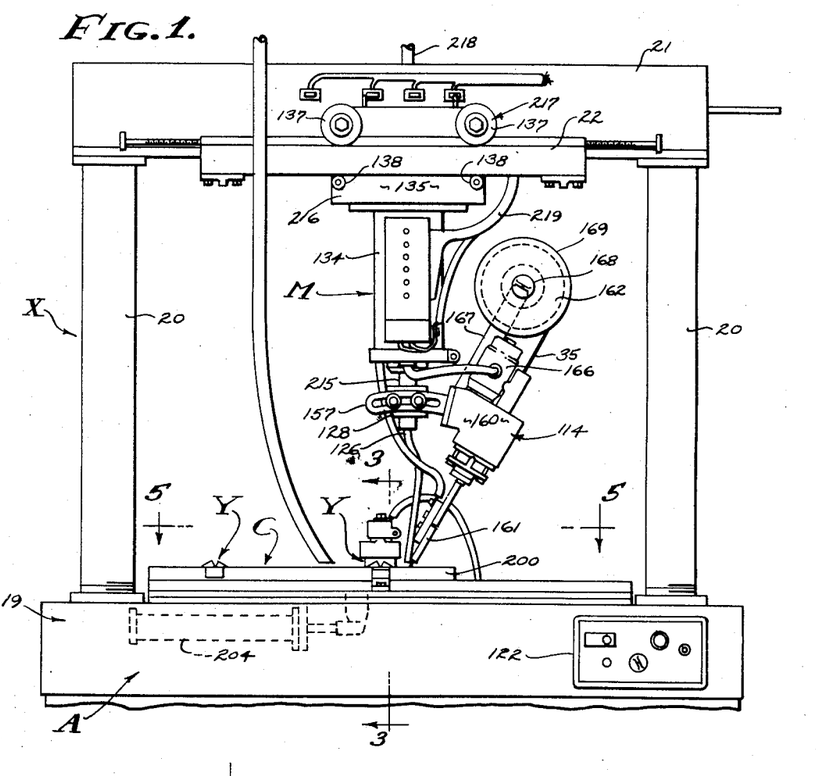
Fig. 1 is a front elvation of a machine employing the slide clamp of the present invention and showing a piece of work in the machine being acted upon by the head.

The machine as set forth in Fig. 1 includes primarily a frame A characterized by a rigid horizontally disposed elongate base 19 carried by suitable supporting structure, standards 20 projecting upward from the base and supporting a horizontal top beam or header 21 and having rails 22 extending longitudinally thereof. The rails 22 are carried by the beam or header 21 through suitable brackets, and they extend horizontally along the front and back side of the header 21.

A work carrier B is provided on the base 19 and is characterized by an elongate table which is a simple flat horizontally disposed plate like part that is shiftable. A fixture C is provided on the carrier B to position the parts to be welded and when the carrier is elongate and extends to the forward end portion of the machine the fixture is preferably fixed on or located at the forward end of the carrier. The fixture C as provided by the present invention is characterized by a rest 25 for the work, and a retainer 26 cooperating with the rest and preferably serving to hold not only the work, but also flux employed as the welding operation is carried out.

A mounting means D is provided supporting the table 24 of carrier B on or from the base 19 of frame A for free movement or reciprocation of the table lengthwise.

An operating means E is provided to reciprocate or operate the carrier B relative to the base of the frame, and an operating means R is provided to operate the retainer 26 of the fixture C.

A work retaining means G is provided and is adapted to engage and hold work on or in the fixture C and is characterized by a shiftable jaw 28. A mounting means H is provided for the retaining means and preferably includes a vertically shiftable stem 29, an arm 30 projecting from the stem and carrying the jaw 28, a carriage 31 carrying the stem for vertical reciprocation, rails 32 on the table 24 extending longitudinally thereof, and rollers 33 on the carriage 31 and engaging and supported by the rails 32.

An operating means I is provided to operate the stem of means H relative to the carriage of means H and is preferably a structure carried by the carriage of means H to shift therewith.

An operating means J is provided for operating the carrier B or the table 24 lengthwise thereof and a stop means K is provided to limit the travel of the table 24 relative to the base 19, while a stop means L is provided to limit or determine the travel or movement of the carriage 31 of means H relative to the table 24.

The frame A of the machine may, in practice, be varied widely in form and construction and, considered generally, this element of the machine is a mounting or support for the various other parts, as will be apparent from a consideration of the drawings. The base 19 of frame A is an elongate horizontally disposed unit having a front end 45 occurring at the front end of the machine, while side parts 46 extend longitudinally of the base 19 and to the rear end 47 of the machine. In a typical and preferred construction, the base 19 is a rectangular unit made up of elongate members or beams, and in the particular case illustrated, there are longitudinal beams 48 extending between the front and rear members of the base intermediate the sides 46 and spaced apart to accommodate elements of the structure.

The work carrier B is provided to support one or more groups or units of work as by means of the fixture C, and in its preferred form it is a part of the machine which reciprocates lengthwise of the base, and has a part or parts at the forward end portion of the machine to support the fixture C to be, in effect, beneath the beam 21 of the frame A. In the form of the invention under consideration, the carrier B is formed essentially of a simple flat, horizontally disposed plate or table 24, which is arranged lengthwise of or parallel with the base 19 of the frame. The table is located at the top of the base, preferably immediately above the top of the base, as clearly illustrated in Fig. 3 of the drawings.

The fixture C as provided by the present invention is, in practice, varied, depending upon the particular work handled by the machine. Where tooth caps are being handled and where these units of work have elongate blades arranged end to end, the fixture C is preferably formed so that it has a rest 25 with a flat top 60 forming a seat to be engaged by the blades of the caps. In the case illustrated, a lip or ridge 61 is provided at the forward edge portion of the rest 25 and projects upwardly somewhat above the top 60 of the rest and forms a stop 62 adapted to be engaged by the forward edges of the blades being handled in the machine.

The retainer 26 of fixture C as provided by the invention is a unit cooperating with the rest 25 and, in the case illustrated, it is a U-shaped member, with a main portion 63 which is straight and which extends parallel with the ridge 61 and is adapted to be arranged adjacent the rear edges of the blades handled by the machine. In the particular case illustrated, the main portion 63 of the retainer is adapted to engage or bear against the rear edges of the blades and the retainer is adapted to be operated so that it is urged forward, to the end that the blades between the portion 23 and the ridge 61 are clamped or held tight between these parts. Forwardly projecting parts or fingers 64 are provided in the ends of the main portion 63 of retainer 26. The fingers 64 are adapted to overlie the terminal end portions of the blades 10 on the rest 25 and extend to or closely approach the ridge 61.

With the construction just described, when the blades are held or clamped by the retainer, the combined retainer 26 and ridge 61 form a structure surrounding and projecting up from the portions of the blades engaged by the bodies of the caps. In the preferred construction, the edges or inner corner portions of the ridge 61 and the parts 63 and 64 of the retainer facing and, in effect, enclosing the bodies of the caps located on the blades that are engaged on the rest, are bevelled, so that there is, in effect, an upwardly opening trough established around the bodies of the caps where these parts engage the blades that are supported by the rest.

In practice, the fixture C is preferably mounted on a slide 200 operating transversely of the table 24 by an operating means 204 and supporting two spaced cap constructions Y for fabrication, one in the course of being welded upon and the other arranged preparatory to being welded. In carrying out the invention, the electric circuit incidental to the welding operation is completed through the fixture, preferably through the rest 25, and for this purpose a conductor 201 handling the welding circuit can be connected to the rest 25 or to an element of the machine to which the rest is grounded, say, for instance, the table 24. The table 24 at the enlarged forward end portion thereof is provided with the transversely shiftable slide 200. Suitable spaced rails 202 are carried by the table 24 to extend transversely of the table, and suitable mounting dovetails 203 are carried by the slide and cooperatively engage the rails. In the form of construction under consideration, the rest 25 having the top face 60 adapted to receive work, is integrally joined to the slide 200 so that it is in effect a part of slide 200, and the slide and its rest portion 25 is of substantial length as clearly illustrated in Figs. 1 and 5 of the drawings. The operating means 204 is a cylinder and piston mechanism operated by fluid pressure under control of a suitable valve.

Figure 3:
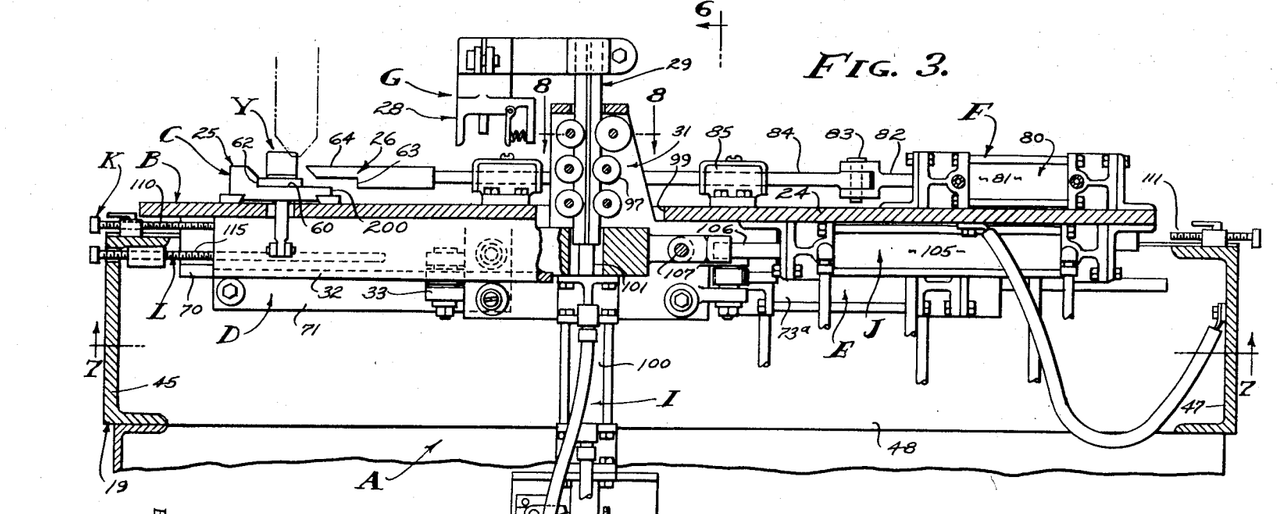
Fig. 3 is an enlarged sectional view of a portion of the machine and taken as indicated by line 3—3 on Fig. 1.
Figure 4:
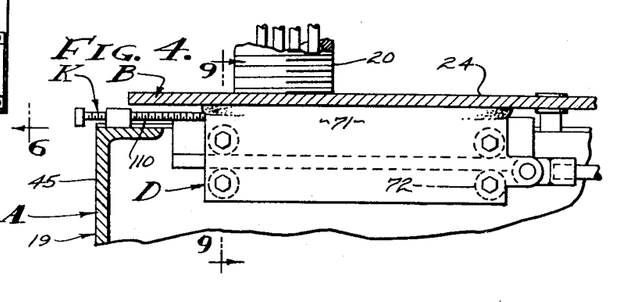
Fig. 4 is an enlarged detailed sectional view taken as indicated by line 4—4 on Fig. 6 and showing a portion of the mechanism.
Figure 7:
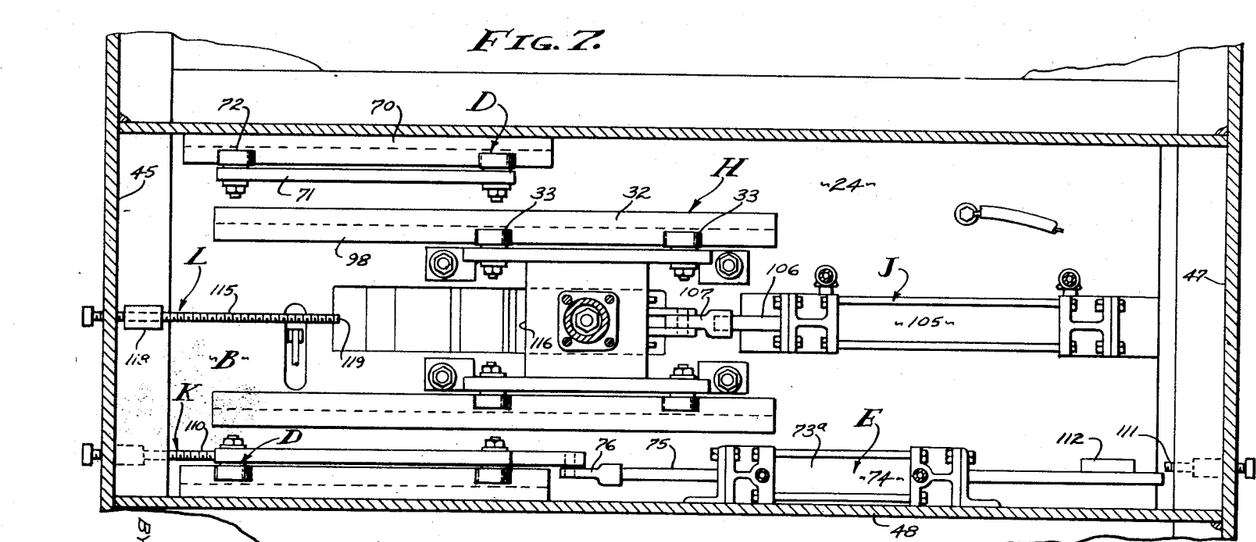
Fig. 7 is a view, looking upwardly, and taken as indicated by line 7—7 on Fig. 3.

The mounting means D provided for supporting the work carrier from the base is best illustrated in Figs. 3 and 7 of the drawings. The means D in the case illustrated includes rails 70 carried by the longitudinal beams 48 of frame A, so that they are horizontally disposed and extend longitudinally of the beams, that is, lengthwise of the base 19. The rails 70, being thus mounted, are located below the table 24, and the table 24 has brackets 71 depending from it and carrying rollers 72 that suitably engage the rails.

Figures 5, 6:
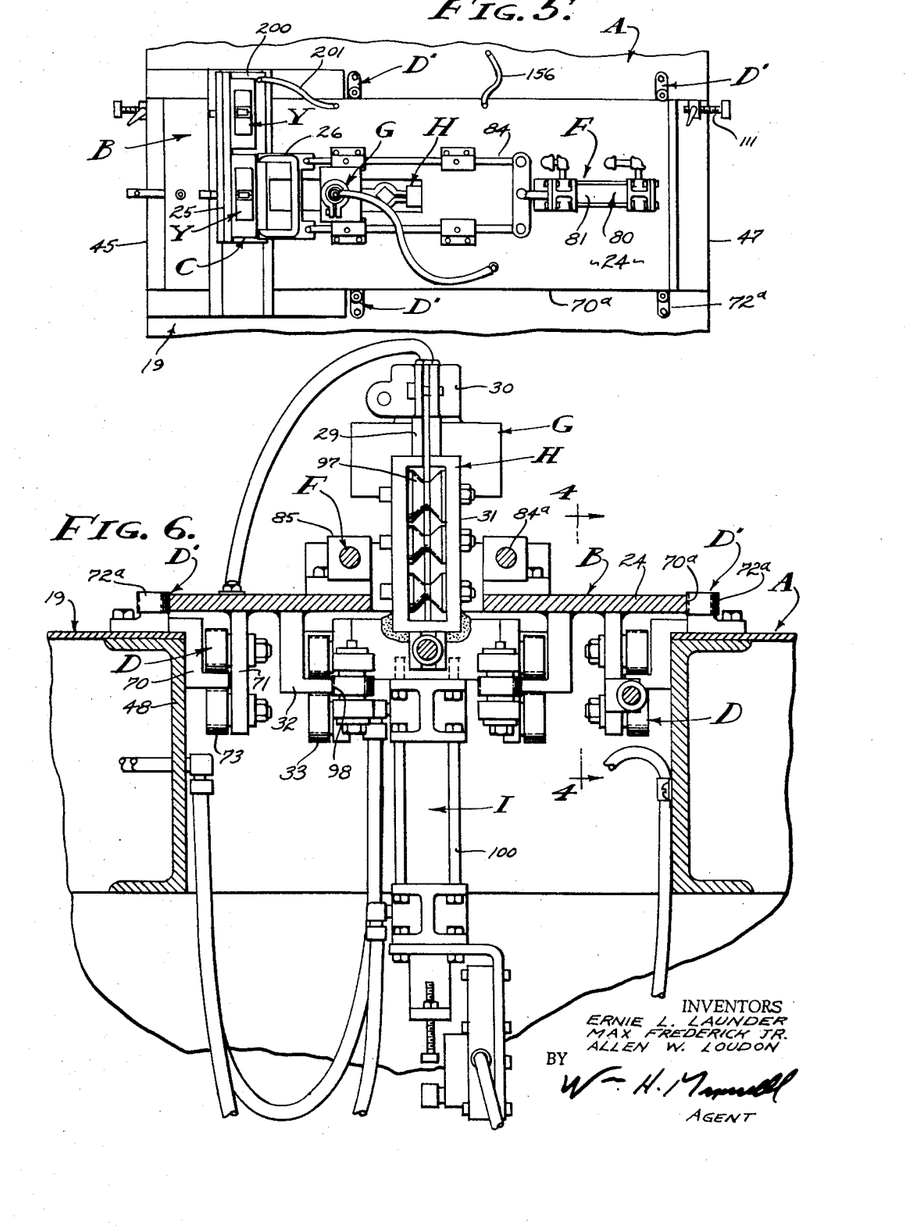
Fig. 5 is a plan view of a portion of the machine taken as indicated by line 5—5 on Fig. 1.
Fig. 6 is a sectional view taken substantially as indicated by line 6—6 on Fig. 3.

A guide means D' is preferably provided to supplement the action of the mounting means D, and it serves to accurately guide the movement of the table 24 relative to the base 19 of frame A. In the form of the invention illustrated, the means D' includes guide rollers 72ª suitably mounted on the top of base 19 and engaging the longitudinal parallel side edges 70ª of the table 24. This general construction is illustrated in Figs. 5 and 6 of the drawings.

The operating means E provided to operate carrier B relative to base 19 of frame A is provided to effect power operation of the carrier and is preferably a fluid pressure actuated means. In the form of the invention illustrated in the drawings, the means E includes a fluid pressure actuated cylinder and piston mechanism 73a, the cylinder 74 of which is anchored to one of the longitudinal beams 48, while the rod 75 thereof projects forward and is joined to the carrier B by a suitable coupling 76.

The operating means F provided to operate or reciprocate the shiftable retainer 26 of fixture C is a power-operated unit or mechanism and is preferably a fluid pressure actuated mechanism. In the case illustrated, the means F involves a cylinder and piston mechanism 80, the cylinder 81 of which is fixed on the table 24 at the rear end portion thereof, while the rod 82 thereof projects forward and is joined by a coupling 83 to a stem 84 which projects forward over the table 24 and connects to and carries the retainer 26. The stem 84 extends through and is guided by suitable bearings 85 mounted on the top of the table 24.

The work retaining means G is adapted to hold and engage the work or work parts in the fixture C. In the case illustrated, the means G is provided to hold or clamp the cap bodies 11 and the blades 10 together and on the rest 25. In the form of the invention illustrated the means G includes a vertically shiftable jaw 28 carried by the terminal end of arm 30 and depending therefrom.

Figure 12:
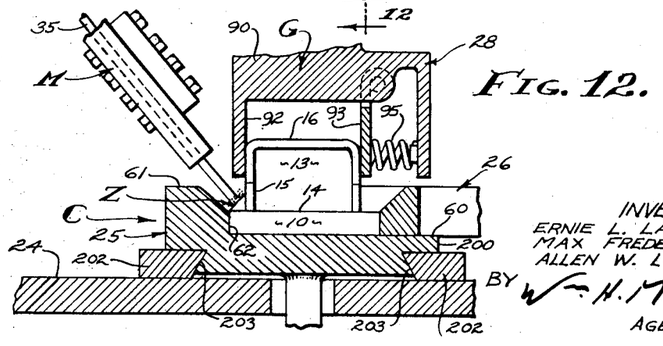

The particular jaw illustrated in the drawings has a horizontally disposed body 90, and teeth 91 depend from the body 90 to engage the uppermost sides of the caps 11 as clearly illustrated in Fig. 11 of the drawings. The jaw 28 has side plates 92 and 93 which depend from the body 90 and which are adapted to engage over the uppermost portions of the caps 11 to be in contact with the sides of the caps, as clearly illustrated in Fig. 12 of the drawings. In accordance with the present invention, the side plate 92 is fixed relative to the body 90, while the plate 93 is shiftable relative to the body, being pivotally connected thereto by means of pivotal connections 94. A spring 95 under compression normally yieldingly bears against plate 93 and urges it toward the plate 92, and, as a result of this construction, when the jaw is engaged with the bodies 11 as shown in Figs. 11 and 12, there is a tight contact or gripping engagement established between the jaw and the work. With the construction above described, the teeth 91 engage the inclined or pitched uppermost surfaces of bodies 11, and serve to effectively center or locate the bodies 11 in the desired manner, as will be apparent from a consideration of Fig. 10 of the drawings.

The mounting means H provided for carrying the means G is characterized by the vertically shiftable stem 29 that carries the horizontally disposed arm 30 which in turn carries the jaw 28 of means G. In the preferred construction, the vertically disposed jaw 28 projects upward from the carriage 31 of means H and the arm 30 is fixed on the upper end of the stem 29 and projects forward therefrom so that the jaw 28 carried by arm 30 is supported forward of the carriage 31.

Figure 8:
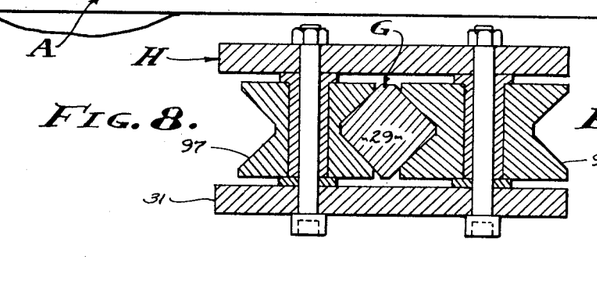
Fig. 8 is an enlarged detailed view of a portion of the machine taken as indicated by line 8—8 on Fig. 3.
Figure 9:
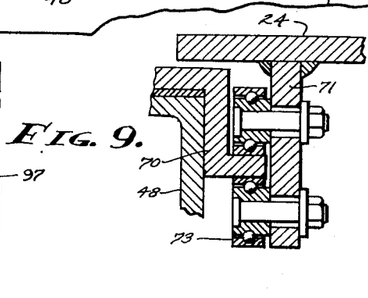
Fig. 9 is an enlarged detailed view of a portion of the machine taken as indicated by line 9—9 on Fig. 4.

The carriage 31 supporting the stem 29 supports the stem for free vertical movement, and, in the construction illustrated, the carriage is equipped with a plurality of rollers 97 which effectively engage and support the stem, as clearly illustrated throughout the drawings and particularly in Figs. 3, 6 and 8 thereof. The stem and rollers are formed and engaged so that the stem will reciprocate freely but will not turn.

The rails 32 of the mounting means H are, in the case illustrated, carried by the table 24 at the under sides thereof, and are spaced parallel rails that extend longitudinally of the table 24 so that they are parallel with the rails 70 which support the table. The rollers 33 of means H are mounted on the carriage 31 to suitably engage the rails 32, and, in the construction illustrated, there are rollers 33 engaging the upper and lower faces of the rails 32, and there are also rollers engaging the opposed edges 98 of the rails 32, to the end that the carriage 31 is accurately supported by the rails and rollers for movement lengthwise of the table 24. The table 24 has an elongate slot-like opening 99 which passes the carriage 31 so that it projects upwardly from below the table to a point above the table, as clearly shown throughout the drawings.

The operating means I, provided to shift the stem 29 relative to carriage 31 is a power means carried by the carriage 31, and it is preferably a fluid pressure actuated mechanism characterized by a cylinder and piston mechanism having a cylinder 100 carried by the carriage 31 and depending therefrom, while a piston rod 101 from the piston of the mechanism projects upwardly and connects to the lower end of the stem 29. The general arrangement and construction of the means I is clearly illustrated in Fig. 3 of the drawings. The means I, being carried by the carriage 31, is at all times engaged with the stem so that the stem can be operated regardless of the position of the carriage, and by locating the means I at the bottom of the carriage so that it depends from the carriage, it in no way interferes with other parts of the structure.

Figure 10:
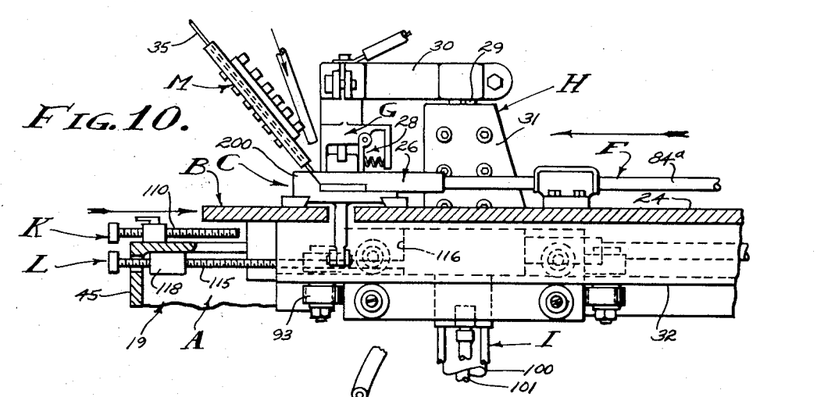
Fig. 10 is an enlarged sectional view of a portion of the structure shown in Fig. 3 at the left hand thereof.

The operating means J provided for operating the carriage 31 of means H is a power means, preferably a fluid pressure actuated means, and in the preferred form of the invention, it includes a cylinder and piston mechanism, the cylinder 105 of which is fixed to the table 24 at the lower side thereof rearward of carriage 31. The piston rod 106 of the cylinder and piston mechanism of means J projects forward from the piston located in cylinder 105 to project from the cylinder 105, and a suitable coupling 107 connects the forward end of the rod 106 to the carriage 31, as clearly illustrated in Fig. 3 of the drawings. Through the action of means J, the carriage 31 of means H can be shifted to move the jaw 28 of means G between a retracted position rearward of fixture C, as shown in Fig. 3 and a working position overlying the fixture C, as shown in Fig. 10, and from the foregoing description it will be immediately apparent that the operating means I serves to shift the stem 29 vertically, so that the jaw 28 can be moved into and out of engagement with the work while in the forward or working position.

The stop means K provided by the present invention serves to limit the movement of the table 24 relative to the base 19, which movement or operation is effected by the means E as hereinabove described. In the case illustrated, the means K includes a forward stop member 110 carried by the base 19 of frame A and adapted to be engaged by and to stop the work carrier when the table thereof has reached the desired forward position. A stop member 111 is carried by the base 19 and is adapted to be engaged by and to stop the carrier B when the table 24 thereof is in the desired rearmost position.

In the construction illustrated, the stop member 110 is in the form of a screw threaded to the base 19 at the forward end portion thereof, and it is located to be engaged by a part on or rigid with the table 24. In the particular case illustrated, the stop screw 110 is positioned to be engaged by the forward end of one of the parts 71 depending from the table 24 to carry rollers 72.

The stop member 111 is preferably a screw threaded to the base 19 at the rear end portion thereof and is located to cooperate with a fixed part 112 on the table depending from the bottom thereof, as shown in Fig. 7 of the drawings. Through the construction just described, the stop screws 110 and 111 can be readily adjusted to set the movement of the table 24 so that the table is operated the desired distance and is stopped in the desired positions when operated by the means E.

The stop means L is preferably carried by the table 24 of carrier B and serves to stop forward movement of carriage 31 of means H in a predetermined position relative to the table or to the fixture C located thereon. In the case illustrated, the means L includes a stop member 115 carried by the table at the lower side thereof, forward of the carriage 31 and in a position to be engaged by a forwardly facing part 116 of the carriage. In the construction illustrated, the stop member 115 is a screw threaded to a part 118 depending from the bottom of the table 24, and it extends longitudinally of the table, so that it is adjustable to vary the position of its end 119 which opposes the carriage 31 and serves to stop forward movement of the carriage. In practice, adjusting the screw 115, the machine can be set so that the jaw 28 supported by the means H is stopped in a predetermined forward position when the means J operates to move the carriage 31 of means H to its extreme forward position.

The electrode or welding head M is provided to handle the welding wire or rod 35 and may vary widely in form and construction, depending upon the welding material being handled, the particular work to be acted upon, and various other factors. A welding head 114 is provided to carry a welding rod or wire 35 and in accordance with the invention a mounting is provided for the welding head 114 and includes, generally, a vertically disposed spindle 215, a carriage 216 supporting the spindle for rotation about a vertical axis, and means 217 mounting the carriage on the rails 22 of frame A. A head 128 is carried by the spindle to support the welding head that has a central opening therein adapted to pass a flux handling means 218 extending vertically through the spindle and to a delivery tube 126. A drive means (not shown) is provided for actuating the carriage 216 so that it is reciprocated transversely above the forward end portion of carrier B, and drive means (not shown) is provided for turning the spindle 215 one step at a time.

The base 19 of frame A is an elongate horizontally disposed rectangular unit. The standards 20 of the frame are located at the forward end portion of the base 19 and are spaced apart transversely of the machine, as clearly illustrated in Fig. 1 of the drawings. The standards 20 are like tubular members that carry the header 21 so that it extends horizontally across the machine above the forward end portion of the base 19 and the carrier B. The rails 22 are carried by the header 21 through suitable brackets and they extend longitudinally of the beam and are horizontally disposed, as clearly illustrated. The work carrier B is provided to support one or more groups or units of work as by means of the fixture C, and in its preferred form it is a part of the machine which reciprocates lengthwise of the base beneath the header 21 of the frame A. The carrier is located at the top of the base, preferably immediately above the top surface thereof.

The spindle 215 is provided to carry the welding head 114 and serves to support the head so that the tip thereof delivers the welding rod 35 at a particular point or in a particular location relative to the carrier B and more specifically, relative to the fixture C, and it supports the head so that it faces downwardly and inwardly toward that point, and so that the head as a whole is rotatable about a vertical axis intersecting at that point and can be moved as desired through a complete circle, that is, through 360°, as circumstances require.

The spindle 215 is an elongate vertically disposed element rotatably supported by carriage 216 to depend therefrom, and is tubular, being provided with a central tubular passage that extends continuously through the spindle from one end to the other to accommodate the flux handling means 218 and to the end that flux is delivered to a flux delivery duct 126 (see Fig. 1). The spindle 215 is supported by carriage 216 through suitable anti-friction bearings in an extension 134 of the carriage, which extension depends a substantial distance below the body 135 of the carriage.

The carriage 216 is a rigid part shiftably supported beneath the header 21 by the means 217 hereinafter described to move transversely of the frame A. The carriage 216 is provided to support and carry the spindle 215 and also the flux handling means 218 and related means.

As clearly illustrated in Fig. 3 of the drawings the carriage 216 has a horizontally disposed body 135 with an opening extending vertically therethrough on the central axis of the carriage. The extension 134 depends from the body 135 and is a tubular extension 134 in the nature of a housing that encloses the spindle 215 and accommodates parts of the electrical power handling means shown at 219. It will be apparent how the spindle is rotatably supported by the bearings 133 and is free to turn on the central vertical axis of the carriage 216.

The means 217 shiftably supports the carriage 216 so that it is movable transversely of the frame A. In the preferred form of construction, the carriage 216 is supported on the rails 22, and there are rollers 137 mounted on opposite sides of the carriage 116 to engage the tops of the rails 22, while rollers 138 on the sides of the carriage engage the bottom sides of the rails. Since the rails 22 are horizontally disposed and are spaced apart and extending lengthwise of the beam 21 of frame A, the carriage is supported as just described for reciprocatory movement horizontally above the fixture C on carrier B.

The head 128 at the lower terminal end portion of the spindle 215 is fixed to the spindle to rotate therewith. A feature of the construction is the insulation of the head 128 from the spindle 215, said insulation being necessary in order to carry out the welding method involved.

The flux handling means 218 is provided to conduct flux through the mounting and to the point of welding in order to immerse the welding arc etc. In carrying out the particular welding method involved, a granular flux material is used which is sand-like and abrasive, to the end that the arc is submerged in or flooded by means of flux, and to the end that there is an ample supply of flux present for welding whereby oxygen is excluded from the weld to prevent burning of the metal etc.

The welding circuit included in the machine may, in a typical situation, involve a D.C. circuit energized by a motor generator set, or the like, and in accordance with the invention, the welding head 114 is energized through a plurality of electrical conductors carrying circuits involved in operation of the head 114 and carrying one side of the welding circuit. The other side of the welding circuit is grounded by a strap 156, and in the particular case illustrated. The strap 156 is a flexible connection shown connecting the table 24 to the base 19.

The mounting structure herein referred to for the welding head 114 is specifically set forth and claimed in co-pending application Serial No. 674,754, filed July 29, 1957, entitled Mounting for a Welding Head in a Work Fabricating Machine.

The welding head 114 is provided to handle the welding wire or rod 35 and is carried by an arm 157 extending laterally of the head 128 which in turn is carried by the spindle 215. In practice, the welding head 114 may vary in form and construction, depending upon the welding material being handled, the particular work to be acted upon, and various other factors. The particular welding head 114 illustrated in the drawings involves, generally, a drive or rod feeding means 160, a rod guiding means 161 carried by and adapted to receive rod fed by the means 160, and a rod supply means 162 for delivering rod 35 to the feeding means 160.

The drive or rod feeding means 160 is supported by the spindle 215, preferably at or by the lower end portion thereof, and it in turn carries the rod guiding means 161, and also carries the other elements of the head 114. The means 160 is characterized by a case adapted to enclose the mechanism thereof and it may be any suitable mechanism of this type, and, in the preferred construction, the means 160 includes a suitable electrical mechanism within the case engaging the rod 35 that passes through the case. In practice, any suitable electrical rod or wire feeding mechanism can be employed in carrying out the present invention, and for this reason, this portion of the mechanism is indicated generally. As shown, there is a prime mover or motor 166 mounted on the exterior of the case that operates the head 114. When the prime mover 116 is operated it moves or propels the rod through the case and delivers it to the rod guiding means 161, later described.

The rod feeding means 160 carried in the case of the welding head 14 is electrically operated, causing the welding rod 35 to be fed to the work at the desired rate. In practice, it is preferred that a motor 166 be employed of the type commonly used in connection with a welding rod feed such as is shown in the drawings, to the end that the feed of welding rod is properly, coordinated with the welding action, as shown, a plurality of circuits is necessary in order to operate such a motor 116.

The guiding means 161 that is provided in accordance with the invention is adapted to adjustably position the welding head 114 angularly relative to the vertical rotative axis of the spindle 215. As clearly illustrated in Figs. 1, 10 and 12 of the drawings, the welding rod 35 is fed through a rod guide on an axis intersecting the vertically disposed axis of the spindle 215, to the end that a point of weld is established at the central axis of the spindle regardless of the rotative position thereof. It is to be observed that the angular relationship of the rod 35 and spindle axis may be varied without displacing the point of weld.

The electrical circuits for welding and to operate the motor 166 operating the feeding means 160 are communicated to the head 114 through power handling means incorporated in the structure at the spindle 215, which means includes, generally, insulated annular contacts on and carried by the spindle and engaged by brushes within the extension 134 of the cariage 216.

The welding head 114 herein referred to is specifically set forth and claimed in copending application Serial No. 631,573, filed December 31, 1956, entitled Welding Head, now Patent No. 2,839,666.

Where the machine is handling the particular work that has been described, it is preferred that the spindle 215 be turned through exactly 90° each time it is operated by the drive means. In this case, the drive means operates so that each time operation thereof is initiated the mechanism of said means operates to advance or turn the spindle 215 through exactly 90°.

In the preferred form of the invention the various drives for example the drives E, I and J are fluid operated drives in which case a suitable fluid pressure supply (not shown) is provided. For instance, a pump delivering fluid at a suitable pressure directs said fluid to valves (not shown) controlling flow to the ends of the cylinder or motors. The valves may be solenoid operated, and adapted to control the flow of fluid, for example, between the ends of the cylinders to reciprocate the pistons and operate the means involved.

In the particular machine illustrated there are various manually operable controls at 122 which, in practice, are made accessible to the operator of the machine and which, considered generally, are to be used in the setting or adjusting of the machine or to control the machine in the event of an emergency, as circumstances may require. A control for operation of the machine is set forth in detail in the above mentioned Patent No. 2,835,786.

From the foregoing description it will be understood that the action of the machine may be fully automatic or under control of an operator. The control of the machine has been mentioned in general only and without specific reference to the details of the particular controls that may be employed. The table and clamp is extremely versatile and may be adjusted and operated to weld a wide variety of parts and assemblies of parts. The tip or terminal end of the welding rod 35 is always fed to the point of weld which is at the central axis of the spindle 215, and the table 24 and work parts thereon is free to be reciprocated in the desired direction through suitable control of the various operating means. The power handling means effectively communicates the necessary electrical currents to the head 114 without interfering with the turning thereof, and the entire carriage 216 and welding head 114 are laterally shiftable. By controlling suitable solenoid operated valves, as above described, the table and clamp and welding head 114 are positioned and operated as circumstances require.

Having described only a typical preferred form and application of the invention, we do not wish to be limited or restricted to the specific details herein set forth, but wish to reserve to ourselves any variations or modifications that may appear to those skilled in the art and fall within the scope of the following claims.

Having described our invention, we claim:

1. In a machine of the character described, a table, a slide mounted on the table to reciprocate relative thereto, a work rest on the slide and movable therewith into and out of a predetermined position, a retainer mounted to reciprocate relative to the table to hold work on the rest and to position said work, and a jaw mounted to shift relative to the table into and out of position adjacent the rest and to reciprocate relative to the rest when in said position to move into and out of work clamping position.

2. In a machine of the character described, a table, a work rest on the table, a retainer, means mounting the retainer on the table to reciprocate relative to the rest and hold work on the rest, a carriage, means mounting the carriage on the table to reciprocate relative to the rest, a stem carried by the carriage to reciprocate relative thereto, and a jaw carried by the stem to be positioned adjacent the rest by movement of the carriage and to clamp work at the rest by movement of the stem relative to the carriage.

3. In a machine of the character described, a table, a slide, means mounting the slide on the table to reciprocate relative thereto, a rest on the slide, a retainer, means mounting the retainer on the table to reciprocate relative to the rest and hold work on the rest, a carriage, means mounting the carriage on the table to reciprocate relative to the rest, a stem carried by the carriage to reciprocate relative thereto, and a jaw carried by the stem to be positioned adjacent the rest by movement of the carriage and to clamp work at the rest by movement of the stem relative to the carriage.

4. In a machine of the character described, a table, means mounting the table for reciprocation, a slide, means mounting the slide on the table to reciprocate relative thereto, a rest on the slide, a retainer, means mounting the retainer on the table to reciprocate relative to the rest in another direction and hold work on the rest, a carriage, means mounting the carriage on the table to reciprocate relative to the rest, a stem carried by the carriage to reciprocate relative thereto, and a jaw carried by the stem to be positioned adjacent the rest by movement of the carriage and to clamp work at the rest by movement of the stem relative to the carriage.

5. In a machine of the character described, a table, a slide, means mounting the slide on the table to reciprocate relative thereto, work rests on the slide and movable therewith one at a time into a predetermined position, a single retainer, and means mounting the retainer on the table to move into and out of position cooperatively with a rest in said predetermined position.

6. In a machine of the character described, a table, means mounting the table for reciprocation, a slide, means mounting the slide on the table to reciprocate relative thereto transversely of the direction of movement of the table, work rests on the slide and movable therewith one at a time into a predetermined position, a single retainer, and means mounting the retainer on the table to move into and out of position cooperatively with a rest in said predetermined position.

7. In a machine of the character described, an elongate horizontally disposed table, a slide, means mounting the slide on the table to reciprocate relative thereto in a direction transverse thereof, work rests on the slide and movable therewith one at a time into a predetermined position, a single retainer, and means mounting the retainer on the table to move longitudinally thereof into and out of position cooperatively with a rest in said predetermined position.

8. In a machine of the character described, a table, a slide, means mounting the slide on the table to reciprocate relative thereto, work rests on the slide and movable therewith one at a time into a predetermined position, a single retainer, means mounting the retainer on the table to move into and out of position cooperatively with a rest in said predetermined position and to hold work and to position said work at said rest, a clamp, and means mounting the clamp on the table to move relative thereto into and out of position to cooperate with a rest in said predetermined position.

9. In a machine of the character described, a rest adapted to support a work part and having a ridge adapted to be engaged by said part, and a retainer adapted to reciprocate relative to the rest and having a portion engageable with said part to hold it against the ridge and having a portion surrounding and positioning said work part.

10. In a machine of the character described, a rest adapted to support a work part and having a ridge adapted to be engaged by said part, and a retainer adapted to reciprocate relative to the rest and having a body portion engageable with said part to hold it against the ridge and having fingers surrounding said work part, the fingers being related to the body portion and cooperating with the ridge whereby the ridge and retainer define a flux retaining trough at the work part.

11. In a machine of the character described, a rest adapted to support abutting work parts and having a ridge adapted to be engaged by said parts, and a retainer mounted to reciprocate relative to the rest and having a body adapted to engage said parts and hold them to the ridge and having spaced fingers adapted to overlie said parts and defining a flux retaining trough surrounding said parts.

12. In a machine of the character described, a rest adapted to support a work part and having a ridge adapted to be engaged by said part, a retainer adapted to reciprocate relative to the rest and having a portion engageable with said part to hold it against the ridge and having a portion surrounding and positioning said work part, and a clamp member mounted to reciprocate relative to the rest and retainer and adapted to be moved into and out of clamping engagement with said part.

13. In a machine of the character described, a rest adapted to support a work part and having a ridge adapted to be engaged by said part, a retainer adapted said parts and defining a flux retaining trough surrounding and positioning said work part, a clamping jaw, a member carrying the jaw, and a carriage supporting said member for movement of the jaw into and out of position adjacent said part and into a position and cooperating with the ridge whereby the ridge and retainer define a flux retaining trough at the work part.

14. In a machine of the character described, a rest adapted to support abutting work parts and having a ridge adapted to be engaged by said parts, a retainer mounted to reciprocate relative to the rest and having a body adapted to engage said parts and hold them on the ridge and having spaced fingers adapted to overlie said parts and defining a flux retaining trough surrounding and positioning said parts, a clamp jaw, a member carrying the jaw, and a carriage supporting said member for movement of the jaw into and out of position adjacent said parts and into a position and cooperating with the ridge whereby the ridge and retainer define a flux retaining trough at the work part.

15. In a machine of the character described, a rest adapted to support a work part and having a ridge adapted to be engaged by said part, and a retainer adapted to reciprocate relative to the rest and having a portion engageable with said part to hold it in position against the ridge and having a portion engageable with a second work part on the first mentioned work part to position it in a predetermined manner relative to said first mentioned work part.

16. In a machine of the character described, a rest adapted to support a work part and having a ridge adapted to be engaged by said part, and a retainer adapted to reciprocate relative to the rest and having a body portion engageable with said part to hold it in position against the ridge and having a finger portion engageable with a second work part on the first mentioned work part to position it in a predetermined manner relative to said first mentioned work part, the finger portion being related to the body portion and cooperating with the ridge whereby the ridge and retainer define a flux retaining trough at the work parts.

17. In a machine of the character described, a rest adapted to support abutting work parts and having a ridge adapted to be engaged by said parts, and a retainer mounted to reciprocate relative to the rest and having a body adapted to engage said parts and hold them to the ridge and having spaced fingers adapted to overlie said parts and to engage and confine other parts resting on the first mentioned parts.

18. In a machine of the character described, a rest adapted to support a work part and having a ridge adapted to be engaged by said part, a retainer adapted to reciprocate relative to the rest and having a portion engageable with said part to hold it in position against the ridge and having a portion engageable with a second work part on the first mentioned work part to position it in a predetermined manner relative to said first mentioned work part, and a clamp member mounted to reciprocate relative to the rest and retainer and adapted to be moved into and out of clamping engagement with said second part.

19. In a machine of the character described, a rest adapted to support a work part and having a ridge adapted to be engaged by said part, a retainer adapted to reciprocate relative to the rest and having a portion engageable with said part to hold it in position against the ridge and having a portion engageable wth a second work part on the first mentioned work part to position it in a predetermined manner relative to said first mentioned work part, a clamping jaw, a member carrying the jaw, and a carriage supporting said member for movement of the jaw into and out of position adjacent said second part for movement while thus positioned into and out of clamping engagement with said second part.

20. In a machine of the character described, a rest adapted to support abutting work parts and having a ridge adapted to be engaged by said parts, a retainer, mounted to reciprocate relative to the rest and having a body adapted to engage said parts and hold them to the ridge and having spaced fingers adapted to overlie said parts and to engage and confine other parts resting on the first mentioned parts, a clamp jaw, a member carrying the jaw, and a carriage supporting said member for movement of the jaw into and out of position adjacent said other parts and for movement while thus positioned into and out of clamping engagement with said other parts.

References Cited in the file of this patent

UNITED STATES PATENTS

| 1,063,999 | Murray et al. | June 10, 1913 |
| 1,894,454 | Todt | Jan. 17, 1933 |